Jan. 12, 1954 A. P. BLANCHARD 2,666,030
SEPTIC TANK
Filed June 21, 1952 3 Sheets-Sheet 1
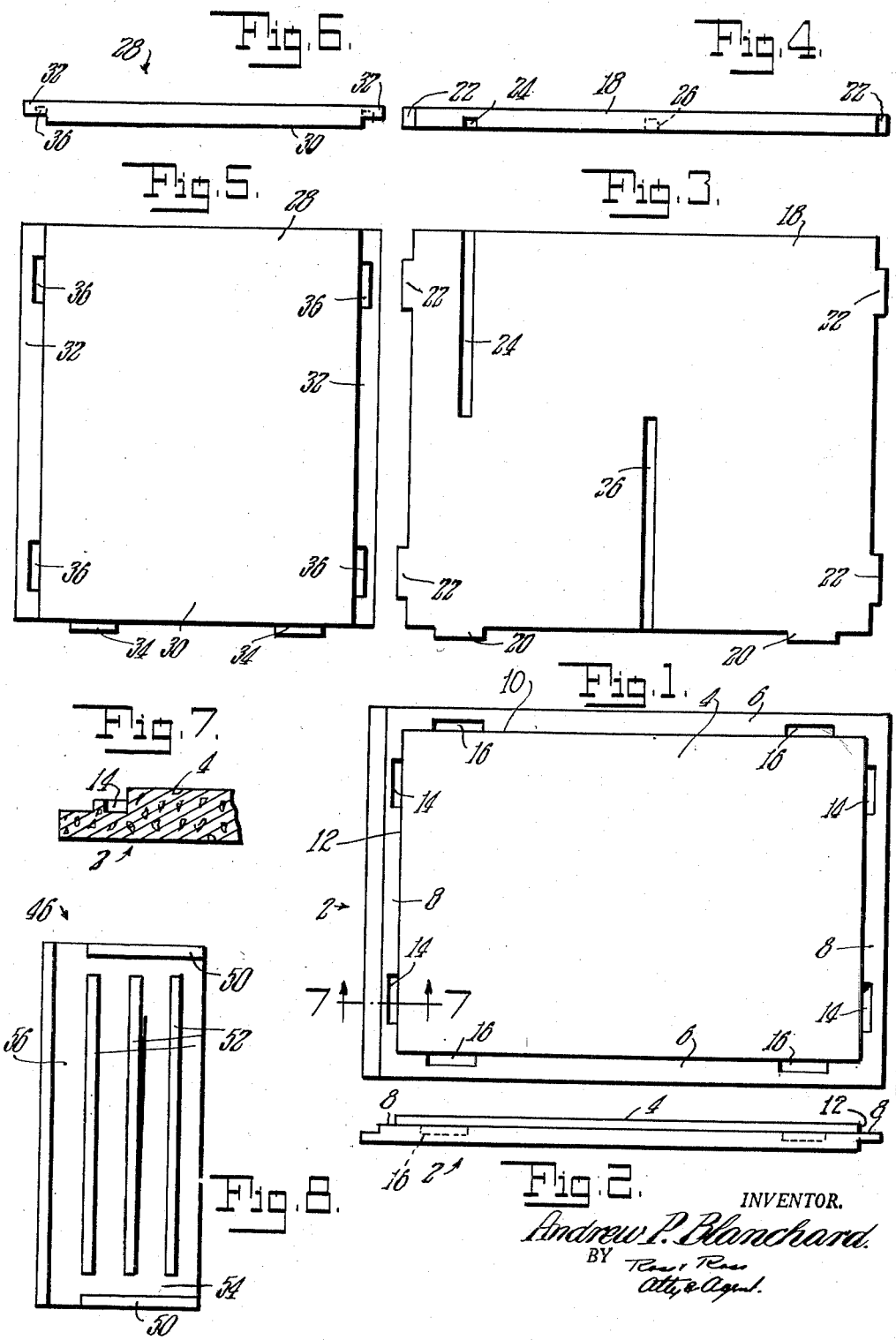
INVENTOR.
Andrew P. Blanchard Jan. 12, 1954 A. P. BLANCHARD 2,666,030
SEPTIC TANK
Filed June 21, 1952 3 Sheets-Sheet 2
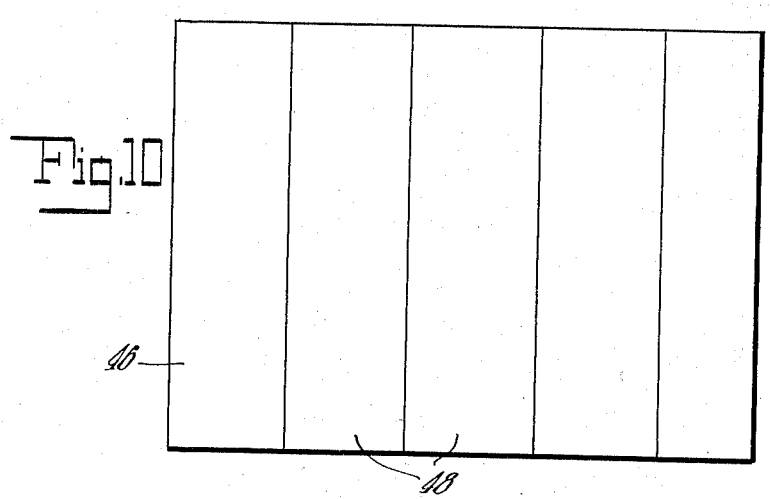
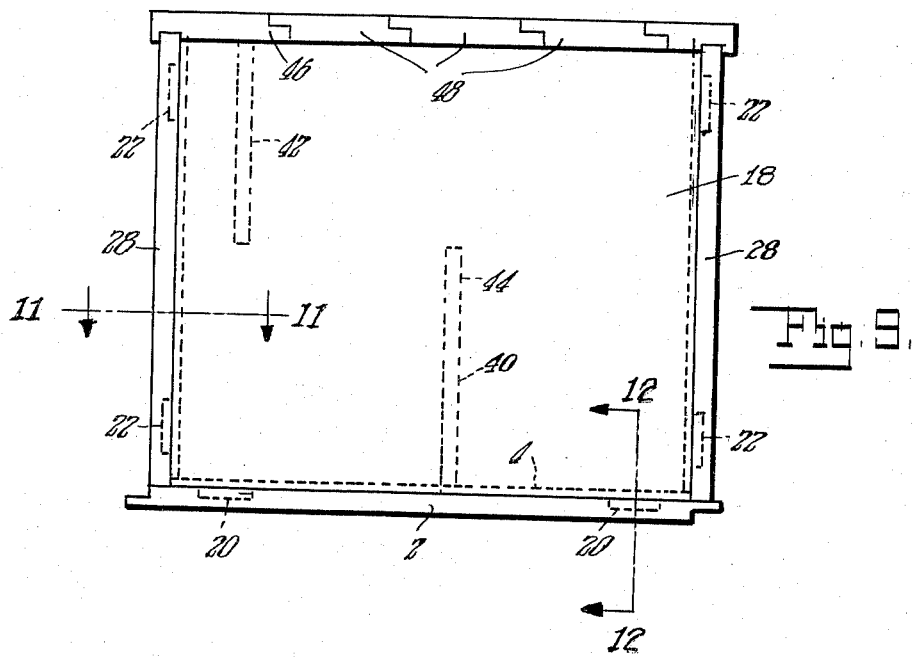
INVENTOR.
Andrew P. Blanchard.
BY Ross & Ross
Atty & Agent Jan. 12, 1954     A. P. BLANCHARD     2,666,030
SEPTIC TANK Filed June 21, 1952     3 Sheets-Sheet 3

INVENTOR.
Andrew P. Blanchard

Patented Jan. 12, 1954

2,666,030

UNITED STATES PATENT OFFICE 2,666,030

SEPTIC TANK

Andrew P. Blanchard, Ludlow, Mass.

Application June 21, 1952, Serial No. 294,776

2 Claims. (Cl. 210—6)

This invention relates to improvements in septic tanks of the type having components adapted for assembling in tank forming relation at the place where the tank is to be used.

The principal features of the invention are the provision of a septic tank having separate walls which are constructed and arranged for ready and easy assembly to provide a strong, rugged tank structure.

All of the above objects I accomplish by means of such structure and relative arrangements of parts thereof, as will fully appear by a perusal of the description below and by various specific features which will be hereinafter set forth.

To the above cited and other ends and with the foregoing and various other novel features and advantages and other objects of my invention as will become more readily apparent as the description proceeds, my invention consists in certain novel features of construction and in the combination and arrangement of parts as will be hereinafter more particularly pointed out in the claims hereunto annexed and more fully described and referred to in connection with the accompanying drawings wherein:

Figs. 1 and 2 are plan and edge views of the bottom wall of the tank of the invention;

Figs. 3 and 4 are side elevational and edge views of one of the side walls adapted for use with the bottom wall of Figs. 1 and 2;

Figs. 5 and 6 are elevational and edge views of the end walls of the tank structure;

Fig. 7 is a sectional view on the lines 7—7 of Fig. 1;

Fig. 8 is an inverted plan view of one of the cover members of the tank structure;

Figure 11:
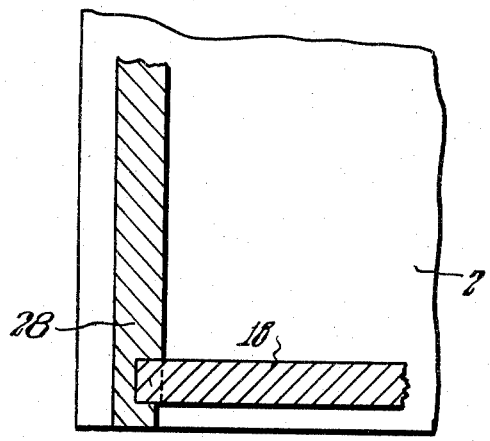
Figure 12:
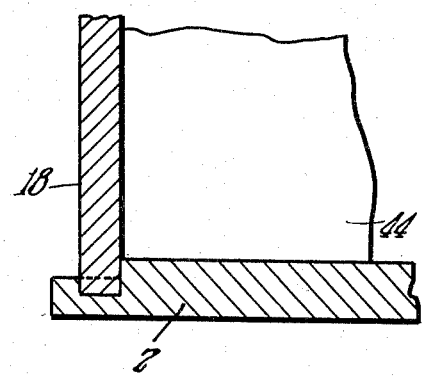

Figs. 9 and 10 are side elevational and plan views of a septic tank embodying the novel features of the invention; and Figs. 11 and 12 are sectional views on the lines 11—11 and 12—12 respectively of Fig. 9.

Referring now to the drawings more in detail, the invention will be fully described.

A bottom wall 2, shown in Figs. 1 and 2, is provided which has a central elevated portion 4 surrounded by side and end rims 6 and 8 for supporting side and end walls and shoulders 10 and 12 against which said walls abut.

End sockets 14 and side sockets 16 open at upper sides are provided for receiving lugs or tongues on the side and end walls as will appear. The said sockets are preferably in the form of elongated rectangles for receiving tongues which are of considerable cross sectional area for the purposes of strength.

The bottom wall described as well as the other members of the tank to be described will be formed from concrete or some other suitable material and may be reinforced or not as may be desired.

Side walls such as 18 have lower lugs 20 for insertion in the sockets 16 of the bottom wall. Other lugs 22 extend outwardly from opposite ends of the side walls for insertion in sockets of end walls to be described.

Upper slots 24 and lower slots extend downwardly and upwardly on inner adjacent faces of the side walls to receive opposite ends of baffles to be described.

End walls 28 such as shown in Fig. 6 have central elevated portions 30 and flanges 32 on opposite sides thereof. Lugs 34 extend from lower edges thereof which are receivable in the sockets 14 of the lower wall 2. Sockets 36 are provided in the flanges 32 of these side walls.

The end walls 28 have lower ends resting on the parts 8 of the lower wall with the lugs 34 thereof disposed in the sockets 14. The side walls 18 extend between the end walls 28 and having their end lugs 22 in the sockets 36 of said end walls. Lower lugs 20 of the side walls are disposed in the sockets 16 of the lower walls.

The side and end walls along lower edges abut the edges of the central portion 4 of the lower wall and ends of the side walls 18 abut opposite side edges of the elevated portion 30 of the end walls.

The parts are made so that the jointure of the walls and lugs in the sockets may be granted.

Partitions 40 and 42 extend between side walls 18 and have opposite ends in grooves 24 and 26 of said walls.

Cover members are provided which are represented by 46 and 48. As in Fig. 8, a cover member has ribs 50 and 52 on the under side thereof providing spaces 54 and 56 therebetween for receiving upper edges of the walls on which they rest.

The walls may be provided with knock-out openings to accommodate inlet and outlet conduits and a plurality of the tanks may be located in adjacency and connected together for operation.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. A septic tank construction comprising in combination, a preformed unitary horizontal bottom wall having a central portion provided with an upper face disposed in a plane above the plane of upper faces of longitudinal side and transverse end portions providing horizontal flat side and end rim portions extending outwardly from the sides and ends of the central portion and vertically extending shoulders along the sides and ends of said central portion, said rim portions at the sides and ends of the central portion provided with separate spaced apart elongated downwardly extending rectangular sockets adjacent said shoulders having inner sides disposed in the planes of said shoulders, preformed unitary vertically extending side and end walls having lower edges resting on the side and end rim portions of the bottom wall and provided with lugs depending from said lower edges fitting in said sockets and arranged to hold inner lower portions of said walls against said vertical shoulders, said end walls having vertically extending central portions disposed in planes inwardly of the planes of longitudinal vertical side portions providing flat flanges extending outwardly from opposite vertical sides of the central portions and vertically extending shoulders at opposite vertical sides of said central portion, said flange portions provided with vertically separate spaced elongated outwardly extending sockets adjacent said shoulders having inner sides disposed in the planes of said shoulders, said side walls having vertical end edges against the flat flanges of said end walls and provided with lugs extending outwardly from said edges and fitting in said sockets holding inner portions of said side walls adjacent the edges thereof against said vertical shoulders.

2. A septic tank construction comprising in combination, a preformed unitary horizontal bottom wall having a central portion provided with an upper face disposed in a plane above the plane of upper faces of longitudinal side and transverse end portions providing horizontal flat side and end rim portions extending outwardly from the sides and ends of the central portion and vertically extending shoulders along the sides and ends of said central portion, said rim portions at the sides and ends of the central portion provided with separate spaced apart elongated downwardly extending rectangular sockets adjacent said shoulders having inner sides disposed in the planes of said shoulders, preformed unitary vertically extending side and end walls having lower edges resting on the side and end rim portions of the bottom wall and provided with lugs depending from said lower edges fitting in said sockets and arranged to hold inner lower portions of said walls against said vertical shoulders, said end walls having vertically extending central portions disposed in planes inwardly of the planes of longitudinal vertical side portions providing flat flanges extending outwardly from opposite vertical sides of the central portions and vertically extending shoulders at opposite vertical sides of said central portion, said flange portions provided with vertically separate spaced elongated outwardly extending sockets adjacent said shoulders having inner sides disposed in the planes of said shoulders, said side walls having vertical end edges against the flat flanges of said end walls and provided with lugs extending outwardly from said edges and fitting in said sockets holding inner portions of said side walls adjacent the edges thereof against said vertical shoulders, said side walls provided with vertically and downwardly extending corresponding grooves on inner sides thereof terminating upwardly from said bottom wall and spaced inwardly from one end wall and a transverse vertically extending baffle having opposite ends in said grooves, and a bottom edge spaced upwardly from the bottom wall, said side walls provided with vertically and upwardly extending corresponding grooves on inner sides thereof terminating downwardly from upper edges of said side walls and disposed intermediate said baffle and the other end wall, and a baffle having opposite ends disposed in said last-named grooves and an upper edge spaced downwardly from upper edges of said side walls.

ANDREW P. BLANCHARD.

References Cited in the file of this patent

UNITED STATES PATENTS

| Number | Name | Date |
| --- | --- | --- |
| 1,334,192 | Thomas et al. | Mar. 16, 1920 |
| 2,412,785 | Torricelli | Dec. 17, 1946 |
| 2,607,211 | Butler | Aug. 19, 1952 |
| 2,607,727 | Butler | Aug. 19, 1952 |